United States Patent [19]

Hood

[11] 4,089,983

[45] * May 16, 1978

[54] COLOR-STABILIZED SEMI-MOIST FOOD AND PROCESS

[75] Inventor: Larry L. Hood, Crystal Lake, Ill.

[73] Assignee: The Quaker Oats Company, Chicago, Ill.

[ * ] Notice: The portion of the term of this patent subsequent to Jan. 4, 1994, has been disclaimed.

[21] Appl. No.: 746,602

[22] Filed: Dec. 1, 1976

[51] Int. Cl.² .......................... A23L 1/27; A23K 1/04
[52] U.S. Cl. ................................. 426/250; 426/263; 426/264; 426/265; 426/540; 426/647; 426/657; 426/805

[58] Field of Search .............. 426/129, 250, 263, 264, 426/265, 540, 647, 657, 805, 656

[56] References Cited

U.S. PATENT DOCUMENTS

| | | | |
|---|---|---|---|
| 2,831,774 | 4/1958 | Furgal et al. | 426/264 |
| 3,122,748 | 2/1964 | Beebe | 426/263 |
| 3,202,514 | 8/1965 | Burgess et al. | 426/532 |
| 3,922,355 | 11/1975 | Kotthoff | 426/250 |
| 4,001,446 | 1/1977 | Hood | 426/250 |

*Primary Examiner*—R. B. Penland
*Attorney, Agent, or Firm*—Mathew R. P. Perrone, Jr.

[57] ABSTRACT

A semi-moist food containing an animal protein source is color stabilized by reacting carbon monoxide with the animal protein source, to provide a satisfactory color.

17 Claims, No Drawings

COLOR-STABILIZED SEMI-MOIST FOOD AND PROCESS

BACKGROUND OF THE INVENTION

This invention relates to a food product and more particularly to a semi-moist food product containing color stabilized animal protein which food product is suitable for either human or pet consumption.

Within the class of pet foods, there are three general subdivisions — dry pet food, moist pet food, and semi-moist pet food. Stability after the pet food package is opened is critical. Dry pet food tends to be the most stable pet food with the least sophisticated packaging required to maintain that stability. Customarily, dry pet food is not as palatable as the other types of pet food. Semi-moist pet food tends to be a relatively stable pet food requiring somewhat more stringent packaging conditions than dry pet food, but with a corresponding increase in palatability. Moist pet food tends to be the most palatable of the three classes of pet food, but requires the most stringent packaging conditions. However, moist pet food is still the most acceptable to pet owners and pets.

It is generally accepted that any member of the class of pet foods must please the owner of the pet, and the pet. The owner is pleased by a pet food which has an appearance close to that of meat. The pet is pleased by a pet food which has an acceptable taste, odor, and other features. Inherent in a meatlike appearance, is a red coloration. One means of achieving a red coloration in a pet food containing meat, or blood is the use of a salt such as sodium nitrite. When present in an aqueous environment, the nitrate ion is in equilibrium with nitrous acid and nitric oxide. The nitric oxide potentially reacts with either the meat protein, myoglobin, or the blood protein, hemoglobin. The specific locus of the combination between such proteins and nitric oxide is believed to be the iron molecule which is permanently present as a reactive site normally reserved for the binding of oxygen. The above proteins carry out the physiological purpose of oxygen transfer to the body. When the binding between the nitric oxide and the protein occurs in combination with heat sufficient to denature or precipitate the protein, a heat-stable, acetone-extractable, red pigment is established. This pigment accounts for the acceptable color in many pet foods. The basic problem with the use of the nitrite to achieve the desired color is the fact that it has undesirable characteristics when consumed. It may be a carcinogen or react to form a carcinogen. These undesirable characteristics render it necessary to find a replacement for the nitrite ion which will achieve the desired color results without having an adverse effect on the pet food.

Further complicating the coloration for foods is the recent banning of dyes which have a long history of use in foods as colorants. This ban, imposed by governmental regulations, further limits the ability of food processors to achieve suitable coloration in the product. A great benefit to the industry may accrue if the coloration problem for the foods can be solved in an acceptable fashion.

Another basic problem with color-stabilizing the above-referenced meat proteins is that the complex formed is more stable when the iron in the protein is in the (Fe II) state. However, it is difficult to maintain that state. The (Fe III) state is more stable. Therefore, the iron content tends to oxidize to the (Fe III) state before the stabilization effect takes place. It is, therefore, desirable to stabilize the above-referenced proteins while maintaining the iron content thereof in the (Fe II) state.

Color is also important for a semi-moist pet food. Semi-moist pet food provides a meat-like appearance to which color greatly contributes and has a moisture content generally ranging from about 15 percent to about 50 percent. Since semi-moist pet foods are higher in moisture content than dry and lower in moisture than canned, special techniques are required to render it microbiologically stable. This moisture content in combination with special techniques may produce a microbiologically stable food which does not require refrigeration. At the same time, the higher moisture content of the semi-moist pet food provides an increased palatability when compared to the dry pet food. The semi-moist pet food is generally rendered microbiologically stable by using high levels of sugar and solutes, or other suitable means. In this fashion, shelf stability without refrigeration is achieved while providing a food having increased palatability relative to dry pet food. If a stable color can be provided for these semi-moist foods, color may be added to the listed advantages thereof.

The stabilization of color in food products is a problem in the art — especially in semi-moist pet foods — in view of the recent government bans on food dyes. Yet the final product appearance aspect renders color stabilization important to semi-moist pet foods.

THE INVENTION

Therefore, it is an object of this invention to provide an improved semi-moist food having a color acceptable to the consumer.

It is a further object of this invention to provide a stabilized red coloring for use in a semi-moist food.

It is a still further object of this invention to provide a replacement for the banned coloring in semi-moist foods.

Also, an object of this invention is to provide a process for color stabilizing a food.

Another object of this invention is to provide a process which color stabilizes a food without the use of banned coloring agents.

These and other objects of this invention are met by providing a process for reacting an animal protein source with carbon monoxide to form a color stabilized protein source and incorporating the color stabilized protein in a semi-moist food, to thereby provide a color-stabilized semi-moist food. This feature is especially applicable to semi-moist pet foods.

DESCRIPTION OF THE PREFERRED EMBODIMENTS

An animal protein source, treated with carbon monoxide to stabilize the color thereof, is incorporated into a semi-moist food to form a color-stabilized food and more particularly, a color-stabilized semi-moist pet food.

Several important variables determine the amount of color stabilization in pet foods formed by the process of this invention. The color stabilization is achieved for the purposes of this invention by treating blood or meat with carbon monoxide. The variables which affect the color obtained include (1) the extent of saturation of potential carbon monoxide bonding sites, (2) the oxidation state of the iron in the protein of the meat or blood, (3) the final concentration of blood or meat protein in the total pet food formulation, and (4) the type of heat (dry or moist) and its application process which stabilizes the color of the carbon monoxide treated material. Color stabilization of the animal protein used in a canned pet food is more thoroughly described in copending U.S. Patent Application No. 626,285 filed Oct. 28, 1975, which matured into U.S. Pat. No. 4,001,446 to Larry Lee Hood, this patent being incorporated herein by reference. This application expands the concept of the Hood patent to semi-moist foods.

The protein source which is more thoroughly or completely saturated has a color much brighter than a protein source which is less saturated. The protein suitable for reaction with carbon monoxide is an animal derived protein source containing hemoglobin, myoglobin, or mixtures thereof. Bonding between the iron and the carbon monoxide is more efficient if the iron is in the (Fe II) state. Within the total pet food formulation, the color is affected by the concentration of the treated and untreated blood or meat protein in the pet food. As moistness of the meat increases, the reaction of the carbon monoxide with the protein increases, and becomes more complete.

In the preferred process for forming the color stabilized animal protein for use in the semi-moist pet food, an aqueous suspension or dispersion or slurry containing appropriate proteins is treated with carbon monoxide to form a bright red, heat stable color. Basically, the protein is an animal protein. The protein is blood or meat, or mixtures thereof. By blood is meant the blood remaining and drained from a slaughtered animal. By meat is meant the flesh of cattle, swine, sheep, goats, horses, whale, and other mammals, in addition to poultry and fish. Also suitable as a meat component of this invention is a meat by-product. By meat by-product is meant those items shown in the 1976 Association of American Feed Control Officials, Inc. under No. 9 Animal Products, page 77 and following which says meat by-products are the non-rendered, clean, wholesome parts other than meat derived from slaughtered animals. Meat by-products include but are not limited to lungs, spleen, kidneys, brains, livers, and partially-defatted, low temperature, fatty tissue — provided these material contain sufficient hemoglobin or myoglobin for reaction with carbon monoxide. If it bears a name description of its kind, it must correspond thereto (Proposed 1973, Adopted 1974, NRC5-00-395).

Meat or meat by-products may be used in the invention in any reasonable size particle. In fact, chunks formed by merely cutting the meat or meat by-products are suitable for use in this process. However, if the meat or meat by-products are ground to a point where they are fine enough to be suspended in an aqueous slurry, the reaction is more efficient and is carried out to a greater extent. For example, the meat may be ground to a size of up to ½ inch (1 centimeter) particles. More specifically, the meat may be ground to a size of about 1/64 inch (0.03 centimeter) to about ¼ inch (0.6 centimeter) particle. Most specifically the meat or meat by-products may be ground to a size of about ¼ inch (0.15 centimeter) to 1/8 inch (0.3 centimeter) particle.

The slurry is formed in any suitable fashion. Blood which has a substantial amount of liquid already present therein requires less water to form the slurry than does meat or meat by-products. The higher the solids content, the longer the reaction takes. However, any amount of solids is suitable for use. The total water content of the slurry includes both added water and water inherently in the meat or meat by-products to be treated. Generally however, the slurry may have up to about 50 percent by weight solids content. More specifically, the slurry may have about 0.1 to about 45 percent by weight solids content. Most specifically, about 5 to about 30 percent by weight solids content is suitable for the slurry. These figures are easily adjusted by a person having ordinary skill in the art to achieve the desired slurrying factors. By "up to" here and throughout the specification is meant that at least a trace of the named component is present at the lower limit.

The slurry is then contacted with carbon monoxide. The contact with carbon monoxide is continued until at least 10 percent of the possible carbon monoxide reaction points are saturated. More preferably, the saturation with carbon monoxide ranges at least about 50 percent. Most preferably the saturation with carbon monoxide ranges at least about 75 percent. The theoretical aspects of saturation are not usually completely achieved. Practically the maximum saturation is obtained at about 80 percent of the theoretical. However, up to and including 100 percent saturation is also possible. The cited saturation points percentages are all based on the theoretical percentage.

The saturation percentage is adjustable to achieve a desired color. Optionally however, the blood can be thoroughly and completely saturated, that is, up to the maximum theoretical standpoint. Color is then adjustable by using untreated material to adjust the color downward or make it less dark.

Optionally minor adjustments in the color of the treated blood or meat can be made by adding colors such as iron oxide, generally having the formula of $Fe_3O_4$, the $Fe_3O_4$ generally being a description of a mixture of $Fe_2O_3$ and $FeO$. Also FD&C food colors such as a Brown mixture, an Orange mixture, or Red may be used for minor color adjustments. These color adjustments can be used individually or in any reasonable combination and are minor in comparison to the carbon monoxide treated protein. For example, both the food coloring and the untreated blood may be mixed to achieve the desired functionality or color. In this fashion there are a variety of means of achieving the desired color. Incorporation of the iron oxide or other materials is 0 to about 0.5 percent by weight of the protein source. More preferably about 0.1 percent by weight of the protein source comprises the coloring.

The slurry thus formed with the protein source and the various dyes is treated in any reasonable temperature. Customarily more efficient gas reaction with the carbon monoxide is achieved at either room temperature or slightly below. It is feasible to heat or cool the slurry for the reaction. However, at the present time the process economics of heating or cooling do not compensate therefor.

One effective way of determining the amount of saturation is to observe the color of the product. This color is determined either visually or by comparison of a standard scale such as that disclosed on the Agtron scale, the Colormaster (Adams) scale, or the Munsell color chart. The stabilized blood or protein generally has an Agtron rating of at least 20 percent. The "L" rating for stabilized blood or protein of this invention on the Colormaster about 25 or higher; the "a" rating 55 or higher; and the "b" rating is generally insignificant due to it being a yellowness measurement. Improved red for the stabilized protein is also shown on the Munsell color scale.

It is also feasible to measure the flow rate to determine the amount of carbon monoxide gas used in the reaction. Standard simple calculations are used to determine the amount of carbon monoxide necessary to react with the protein source. When it is desired to form a completely saturated protein source having all carbon monoxide reaction sites saturated, the carbon monoxide may be used in excess to assure the complete reaction. Again the standard calculations are permitted to determine exactly what source and amount of carbon monoxide are usable. For example, typical methods for determining carbon monoxide concentration include the Van Sylke manometric determination which is a standard clinical chemistry method, or the Conway micro diffusion cell method using palladium chloride with a back titration of the liberated hydrochloric acid. Other known methods are also suitable for this purpose of determining the carbon monoxide saturation of the protein source.

The most effective way of binding carbon monoxide to the protein source is to have the iron content of the protein be in the (Fe II) state. Frequently, however, the iron in the protein oxidizes to the (Fe III) state. In this state, binding of the carbon monoxide is not efficient and a proper red color is not achieved. In order to avoid the oxidation to the (Fe III) state, at least two options are possible. For the first option, the protein source may be used quickly enough to prevent such oxidation. For a second option, an edible reducing agent is incorporated into the protein in an amount sufficient to reduce most of the iron to the (Fe II) state. Too much reducing agent may adversely affect other food components — such as vitamins. Typical edible reducing substances may be used singly or in combination. Satisfactory examples of edible reducing substances include ascorbic acid and salts thereof, sulfur dioxide, or sodium bisulfite. Other suitable edible reducing substances include erythorbic acids and salts thereof. A suitable salt is sodium erythorbate or sodium ascorbate. Generally speaking, these reducing agents are used in an amount of 0 to about 2 percent by weight of the protein source. More preferably, the amount of the reducing agent is a trace amount to provide the reduction of (Fe III) to (Fe II) to about 1 percent. Most preferably, the amount of reducing agent is a trace amount to about 0.2 percent. The use of these reducing agents permits the storage of the protein source until use as desired in the color stabilization process, and, even if the protein is used immediately, guarantees the (Fe II) state of the iron. Other options may also prevent the oxidation of the iron.

Besides reducing the iron in the protein source to the (Fe II) state, further process limitations assist the completion of the reaction. Preferably, the content of the carbon monoxide is increased by agitating the aqueous suspension while contact is made between the suspension and the carbon monoxide. One way to promote an efficient combination between carbon monoxide and the protein source is to agitate these materials together in a sealable (gas tight or oxygen impermeable) vessel. The guiding principle is the controlled saturation of carbon monoxide binding in the heme proteins. How this is accomplished is obvious to one skilled in the art of processing such mixtures. One possible way to accomplish this process is to proceed as follows: Firstly, animal protein slurry is placed in an air tight vessel. Secondly, carbon monoxide is admitted to purge the vessle of air. Then, the vessel is sealed and agitated with a shaking or oscillatory motion, or slow rolling action.

These variables are manipulatable to obtain various shades of red in the product. Generally, reaction times range from about 0.5 minutes to about 80 minutes. More preferably, the reaction time is from about 1.0 to 60 minutes. The time may vary due to attainment of different agitator rates, state of heme protein, temperature or other process conditions, which, a person having ordinary skill in the art may determine in view of the disclosure in this application.

Agitation can be done in any suitable equipment that utilizes efficient method of gaseous transfer across water slurry film. Typical agitation includes a wrist shaker, or other manipulation of the protein source. Suitable agitation produced by rotation of the reacting vessel ranges from about 5 to about 45 rpm. More preferably, the rotation agitation ranges go from about 20 to 25. Most preferably, the suitable shaking agitation range goes from about 170–190 cycles per minute.

The treated proteins used in the semi-moist pet food of this invention are highly stable. The color is not apparently extractable with acetone as is the case with the nitrite hemoglobin complex. Stability of the carbon monoxide complex with the hemoglobin or myoglobin is further indicated by only slight solubilization in ammonium hydroxide. This reaction of the carbon monoxide has the further effect of stabilizing and having no adverse effect on the protein is indicated by the fact that the gel electrophoresis patterns are not altered by the carbon monoxide treatment of the protein.

If it is not desired to use the carbon monoxide treated protein immediately, frozen storage is the most stable means of retaining the product for future use. Refrigeration storage is acceptable, but use must be made more quickly in order to avoid the microbial deterioration.

Following preparation of the slurry and the color-stabilized protein, other ingredients, such as a water soluble solutes, vegetable protein, animal protein containing hemoglobin or myoglobin, or animal protein containing substantially no hemoglobin or myoglobin, are added to the color stabilized protein and mixed therewith to achieve a "dough" typical of semi-moist products. Mixing is preferably, but not necessarily accomplished in dark conditions and avoids unnecessary heating of the dough. A mixing temperature near or slightly below room temperature is preferred. The dough is extruded in a fashion considered normal for this type of product, and a product color is achieved which reflects the addition of carboxy derivatives of heme proteins.

The technology of semi-moist pet foods is well known and is the subject of prior U.S. Pats., exemplified by Bone, No. 3,380,832; Burgess, No. 3,202,514; and Burkwall, No. 3,974,296; incorporated herein by reference. In general, semi-moist, meat-like pet food is designed to resemble freshly ground meat, or marbled meat chunks. The use of carboxyhemoglobin or carboxymyoglobin imparts the red, meaty appearance to the semi-moist product. The requirement of using various synthetic dyes which, according to the Food and Drug Administration, possess questionable toxicological properties is thus avoided. Furthermore, because of the controllable nature of color development in the carboxyhemoglobinmyoglobin process, it is now possible to produce color variation ranging from brownish-purple (liverlike) to pinkish-red (fresh meat) in a semi-moist pet food.

Color change can occur when the carbon monoxide treated protein is being used in a semi-moist pet food. It is possible to vary the final shade of red from bright red to one of more brown character by heating the product to temperatures of about 70°–80° C. in an open condition prior to packaging the pet food. Such heat induced color loss is less drastic if the protein is treated with reducing agent or if the heating is conducted in a closed container, to thereby provide moist heat conditions. In semi-moist products, product heating is accomplished during extrusion. Maximum color of a semi-moist product carbon monoxide treated animal protein source is achieved when this product exits the at 65° C. to 80° C. by adjusting extruder jacket temperatures properly. As is well-known in the art, extruders have various zones — each zone capable of being maintained at a different temperature. It is therefore possible to cool the last zone the product is in prior to emergence from the extruder to thereby cool the product to the desired temperature. Such temperatures are sufficient to pasteurize the product without degradation of color. Higher extrusion temperature may be utilized to satisfy the continuity in the manufacture of certain semi-moist product. Generally however, higher extrusion emergence temperature (above about 120° C.) produces a less than maximum color yield.

Extrusion of semimoist products may be done in a closed heating system (85°–120° C.) to provide heat conditions although the product emerges at a temperature in that range. This emergence of the product at such a high temperature constitutes open heating of the product which adversely affects the color. Another way to achieve a suitable product is achieved by using a cooling coil or tube for adjusting the temperature of emergent product back to 70°–80° F. (20°–30° C.). In other words the extruded dough is extruded directly into a zone having a temperature of 20° C. to 30° C. to thereby quickly cool the product. Although such a precaution is not absolutely required for utilization of this color system, it insures maximum retention of the red component associated with a particular level of carboxy derivative.

An alternative method of product preparation which avoids open heating of carbon monoxide treated protein includes the following steps. Bovine blood and/or by-products are saturated to 100% theoretical with CO and mixed with propylene glycol. Other ingredients are assembled, mixed and heated to 80° C. to 100° C. to promote gelatinization of starch and cooking of meats. This mixture is cooled to room temperature, mixed with the carbon-monoxide treated blood and/or by-products and extruded at room (20° C. to 30° C.) temperature.

A typical semi-moist pet food has about 3 percent to about 65 percent of at least one protein source therein. The protein source may be all animal protein which contains heme or myoglobin, or mixtures thereof with vegetable protein, meat meals or other animal protein, the other animal protein being free of myoglobin or hemoglobin. Part or all of the hemoglobin or myoglobin may be saturated with CO. The meat or meat by-products present in the semi-moist pet food are generally present within the range of about 3 percent to about 65 percent by weight of the semi-moist pet food. More preferably, the meat is present within the range of about 5 percent to about 40 percent by weight of the semi-moist pet food. Most preferably the meat is present in an amount in the range of about 10 percent to about 35 percent by weight of the semi-moist pet food.

The pet food optionally also contains at least one vegetable protein from sources such as soy, cottonseed, peanut or other suitable vegetable protein. Within the semi-moist pet food, the vegetable protein is present in a total amount of about 0 to 65 percent, and more preferably about 5 percent to about 50 percent. Most preferred, however, is 10 percent to 45 percent by weight vegetable protein. Protein for the pet food is provided by vegetable protein, animal protein (including meat, meat by-products and meat meals), or mixtures thereof.

A bacteriological and microbiological inhibitor system suitable for use in this semi-moist pet food is generally a two or more component stabilizer comprising at least one polyhydric component, a sugar source, and at least one antimycotic. Generally speaking, the polyhydric alcohol component or alcohol is present in amounts sufficient to provide semi-moist stability alone or in the presence of sugar. The polyhydric alcohol and the sugar source are defined in the semi-moist patents cited herein and are present in amounts sufficient to provide semi-moist stability.

The antimycotic is generally present in an amount sufficient to prevent mold on a semi-moist pet food. More specifically, it is present up to about 0.5 percent by weight of the semi-moist pet food. More preferably 0.01 percent to 0.3 percent antimycotic is used. A suitable antimycotic includes potassium sorbate, sorbic acid, calcium propionate, and methyl and propyl paraben. The preferred antimycotic is potassium sorbate.

An edible acid or acid salt may optionally be present as a part of the microbiological and bacteriological inhibitor system to provide a neutral or slightly acidic food having a pH of from 4.5 to 7.5 in an amount 0 to about 3 percent by weight of the semi-moist pet food. More preferably 0.1 percent acid to 2.5 percent acid is used. A suitable edible acid includes acids such as fumaric acid, hydrochloric acid, citric acid and acetic acid. However, phosphoric acid is preferred because of phosphorus content, availability, and other desirable features. These acids or salts thereof (for example sodium or calcium salts) are compatible with the carbon monoxide, color-stabilized protein.

Other additives present in the semi-moist composition optionally include, but are not limited to, a vitamin mix and a mineral mix. The mineral mix and the vitamin mix are added for nutritional purposes. A further additive to the pet food may be at least one salt added for purposes of taste, nutrition, or a combination of purposes which are well known in the art. Typical salts include sodium choloride (table salt — either iodized or uniodized), and potassium chloride. These additives are present in a sufficient amount to improve taste and nutrition if required and may total up to 10 percent by weight of the pet food. More preferably, these additives may total 0.25 percent to 5.0 percent.

Other additives are disclosed in U.S. Pat. Nos. 3,380,832 to Bone, and 3,765,902 to Charter, both patents being incorporated herein by reference. Additionally the patents illustrate semi-moist pet foods modifiable by this invention.

An especially suitable product of this invention is in the semi-moist category of pet foods. The moisture content ranges from about 15 percent to about 50 percent by weight of the product. More preferably the moisture content is 18 percent to 45 percent. Most preferably the moisture content is 20 percent to 40 percent. By moisture content is meant the water content of the semi-moist pet food whether the water is present as free water, part of at least one other pet food component, or combinations thereof.

Packaging of the resulting product can be accomplished in any suitable fashion. Either air permeable or air impermeable films may be used. The films may be transparent, translucent, or opaque and made of any suitable material. Typical packaging materials include polyethylene film. The packages may be flexible or rigid, a pouch or a can. It is especially desirable that the package include as at least one layer thereof an oxygen impermeable film or coating. Typically oxygen impermeability is achieved by using a polyethylene terephthalate film or coating. Also an oxygen scavenger may be incorporated in the package to remove residual oxygen in the package or to remove oxygen from air entering the package if the package is not air impermeable. A typical oxygen scavenger is glucose oxidase. The further packaging requirements for this product are well within the skill of the packaging technologist.

The following examples are intended to illustrate, without unduly limiting the invention. All parts and percentages are by weight unless otherwise specified.

EXAMPLE 1

Beef lungs (approximately 75 percent moisture and 25 percent solids) are ground through a 1/8 inch plate and then emulsified to form a slurry which is placed in a sealable container having a volume 8 to 10 times greater than the liquid volume. The container is rendered gas tight by a closure fitted with two gas valves, one suitable for the admission of gases, the other for exit of air and reaction gas. The container, now referred to as a reaction vessel is purged with a volume of carbon monoxide equal to four times the vacant space of the reaction vessel. The vessel is completely sealed, having insured that the vacant space above the blood is totally occupied with carbon monoxide and the vessel is agitated at 180 cycles per minute. Such agitation constantly coats the reaction walls with a thin film of the slurry and thereby guarantees complete reaction of carbon monoxide with the myoglobin binding sites after thirty minutes. This example is substantially Example 4 of the referenced Hood Patent and shows formation of a carbon monoxide treated protein to thereby stabilize the color.

EXAMPLE 2

U.S. Pat. No. 3,974,296 to Burkwall discloses a simulated meat comprised of: 25 parts by weight beef tripe; 25 parts by weight sucrose; 16 parts by weight soy grits; 16 parts by weight soy flour; 9.7 parts by weight beef intestines; 4 parts by weight propylene glycol, 0.3 parts by weight potassium sorbate; 4 parts by weight salt, vitamins, and minerals; sufficient food coloring to provide a red meat-like color and sufficient water to bring the moisture content to about 25 percent by weight. This mixture is then heated to about 85° C. and extruded into small strands forming an acceptable simulated meat product. This product is a standard red simulated meat product known in the art.

EXAMPLE 3

The process of Example 2 is repeated replacing an equivalent amount of beef tripe with 25 parts by weight beef lungs and eliminating red food coloring to form a control product having a brownish, greyish color. Beef tripe appears to be white and contains no hemoglobin or myoglobin.

Secondly, the process of Example 2 is repeated again, but this time 25 parts by weight replacing the beef tripe with an equivalent portion of the beef lung reaction product of Example 1 to provide a formula B. By examination according to the procedure of the Hood patent, the color of Formula B containing the carbon monoxide treated beef lungs is superior to Formula A which contains untreated beef lungs. The red color of Formula B is also comparable to the red color of the food dye-containing product of Example 2.

EXAMPLE 4

The procedure of Example 2 is repeated with the following exception. An equivalent amount of beef tripe is replaced with five parts by weight of carbon monoxide treated blood and the red food coloring is omitted. The color of this product is superior to the color of Example 2. The carbon monoxide treated blood is formed in a manner similar to that of Example 1 of the instant application and Example 1 of the Hood patent.

EXAMPLE 5

The pet food of Example 1 of U.S. Pat. No. 3,380,832 to Bone (incorporated herein by reference) is formulated using a base of red and marble (Control A). The Bone Example 1 is repeated replacing the beef trimmings in the base red with 100 percent carbon monoxide saturated beef trimmings and eliminating all other dyes in the base to make Formula B in accordance with this invention. The pet food (Formula B) containing the carbon monoxide saturated beef trimmings is superior in color and nutrition to the pet food of Example 1 in Bone. However, it is necessary to cool the emerging product to 25° C. by extruding directly into a refrigerated zone at a temperature of 25° C. to avoid raising the air temperature.

Example 1 of Bone is repeated eliminating all dyes in the base to provide Formula C, which is inferior in color to Formulas A and B.

EXAMPLE 6

A sample of Formula B of this invention as set forth in Example 5 is divided into a first part and a second part. The first part is packaged in a transparent, air impermeable film. The second part is packaged in a transparent air permeable film. The packages are stored at 20° C. and relative humidity 50 percent for two months. The color of the packaged first part deteriorates more than the color of the packaged second part — thereby indicating the air impermeable film to be a more desirable packaging film than the air permeable film.

Having thus fully described and clearly disclosed the invention, what is claimed and sought to be secured by Letters Patent of the United States is:

1. In a semi-moist meat-like pet food having a moisture content of 15 percent to 50 percent comprising:
   a. about 3 percent to about 65 percent of a protein source selected from the group consisting of an animal protein source containing hemoglobin or myoglobin, and at least one component selected from the group consisting of a vegetable protein, a meat meal, and an animal protein source substantially free of hemoglobin or myoglobin;
   b. a sufficient amount of a microbiological and bacteriological inhibitor system to provide semi-moist stability for the semi-moist pet food;
   c. sufficient additives to adjust taste and nutrition; and d. a coloring agent — all percentages being based on the weight of the pet food; the improvement wherein the coloring agent is at least partially replaced with a reaction product comprising at least part of the animal protein source containing hemoglobin or myoglobin and carbon monoxide.

2. The semi-moist pet food of claim 1 wherein the reaction product comprises the hemoglobin- or myoglobin-containing animal protein source being at least 10 percent saturated with carbon monoxide.

3. The semi-moist pet food of claim 2, wherein the reaction product is at least 50 percent saturated with carbon monoxide.

4. The semi-moist pet food of claim 3, wherein the coloring agent is completely eliminated and color for the semi-moist pet food is provided by the reaction product.

5. The semi-moist pet food of claim 4 wherein the reaction product is at least 80 percent saturated with carbon monoxide.

6. The semi-moist pet food of claim 5 wherein the reaction product is 100 percent saturated with carbon monoxide.

7. A process for making a semi-moist, meat-like, pet food comprising:
 I. forming a reaction product of an animal protein source containing hemoglobin or myoglobin and carbon monoxide;
 II. adding the reaction product in an amount sufficient to provide a suitable red color to a first mixture to form a red mixture wherein the first mixture comprises:
  a. about 3 percent to about 65 percent of at least one protein source selected from the group consisting of an animal protein source containing hemoglobin or myoglobin, a vegetable protein, a meat meal, a meat and bone meal and an animal protein source substantially free of hemoglobin or myoglobin;
  b. a sufficient amount of a microbiological and bacteriological inhibitor system to provide semi-moist stability for the semi-moist pet food;
  c. sufficient water to provide a final moisture content of 15 percent to 50 percent;
  d. sufficient additives to adjust taste and nutrition; and
  e. a coloring agent;
 III. heating the red mixture to form the semi-moist meat-like pet food; and
 IV. recovering the semi-moist meat-like pet food.

8. The process of claim 7 wherein the reaction product is at least 10 percent saturated with carbon monoxide.

9. The process of claim 8, wherein the reaction product is at least 50 percent saturated with carbon monoxide.

10. The process of claim 8 wherein the red mixture is:
 a. heated while being extruded to a temperature in the range of 80° C. to 120° C; and
 b. extruded into a zone having a temperature in the range of 20° C. to 30° C. to thereby cool the product.

11. The process of claim 8 wherein the red mixture is passed through an extruder and emerges from the extruder at a temperature of about 65° C. to 80° C.

12. The process of claim 8 further comprising adding to the animal protein source containing hemoglobin or myoglobin, a sufficient amount of at least one edible reducible agent to reduce $Fe^{+3}$ present in the animal protein source containing hemoglobin and myoglobin to $Fe^{+2}$ and then forming the reaction product.

13. The process of claim 12 wherein the reducing agent is at least one selected from the group consisting of erythorbic acid, ascorbic acid, sulfur dioxide, sodium bisulfite, sodium erythorbate, and sodium ascorbate.

14. The process of claim 9 wherein the coloring agent is completely eliminated and color for the semi-moist pet food is provided by the reaction product.

15. The process of claim 14 wherein the reaction product is at least 80 percent saturated with carbon monoxide.

16. The process of claim 15 wherein the reaction product is 100 percent saturated with carbon monoxide.

17. A package of food comprising a transparent substantially oxygen impermeable film suitable for wrapping a food, the film enclosing in an oxygen impermeable fashion a semi-moist, meat-like pet food having a moisture content of 15 percent to 40 percent comprising:
 a. about 3 percent to about 65 percent of a protein source selected from the group consisting of an animal protein source containing hemoglobin or myoglobin, and at least one component selected from the group consisting of a vegetable protein, a meat meal, and an animal protein source substantially free of hemoglobin or myoglobin;
 b. a sufficient amount of at least one component selected from the group consisting of a polyhydric alcohol and a sugar source to provide semi-moist stability for the semi-moist pet food;
 c. 0 percent to about 3 percent of at least one edible acid;
 d. sufficient additives to adjust taste and nutrition; and
 e. a reaction product comprising at least part of the animal protein source containing hemoglobin or myoglobin and carbon monoxide — all percentages being based on the weight of the pet food.

* * * * *